US006721257B2

(12) United States Patent
Alperovich et al.

(10) Patent No.: US 6,721,257 B2
(45) Date of Patent: Apr. 13, 2004

(54) MULTILAYER RECORDABLE OPTICAL MEDIUM WITH FLUORESCENT READING

(76) Inventors: Mark Alperovich, Hametech Hizkiya 33/3, Ashdod, 77152 (IL); Eugene Kapinus, Barbusa Str., 5b, ap. 71, Kiev, 252134 (UA); Irene Zuhl, 10/3 Yoav ben Tzreye St., 77535 Ashdod (IL); Jacob Malkin, Hanavi Havakouke 13/2, Ashdod, 77152 (IL); Eugene Levich, Apt. 9L, 330 W. 45th St., New York, NY (US) 10036; Vladimir Schwartz, 12 Revolutionary Rd., Lexington, MA (US) 02421

( * ) Notice: Subject to any disclaimer, the term of this patent is extended or adjusted under 35 U.S.C. 154(b) by 185 days.

(21) Appl. No.: 09/872,014

(22) Filed: Jun. 4, 2001

(65) Prior Publication Data

US 2002/0098446 A1 Jul. 25, 2002

Related U.S. Application Data

(60) Provisional application No. 60/264,024, filed on Jan. 26, 2001, and provisional application No. 60/208,505, filed on Jun. 2, 2000.

(51) Int. Cl.$^7$ .................................................. G11B 7/00
(52) U.S. Cl. ................. 369/108; 369/275.1; 430/270.11
(58) Field of Search ........................... 369/47.1, 53.1, 369/59.1, 108, 275.1, 275.2, 272, 283, 284; 430/270.15, 270.11

(56) References Cited

U.S. PATENT DOCUMENTS 5,399,451 A * 3/1995 Hashida et al. ........ 430/270.15
6,115,344 A * 9/2000 Gudesen et al. ............ 369/100

* cited by examiner

Primary Examiner—Muhammad Edun

(57) ABSTRACT

In a multilayer recordable optical medium, each recording layer includes a luminophore that fluoresces under reading laser light and a quencher capable of quenching the luminophore fluorescence. Initially, the luminophore and the quencher are not intermixed, so that the default state of the luminophore is fluorescent. During writing, focused writing radiation heats a spot in the medium so as to cause the luminophore and the quencher to be intermixed, thereby quenching the fluorescence.

57 Claims, 4 Drawing Sheets

MULTILAYER RECORDABLE OPTICAL MEDIUM WITH FLUORESCENT READING

REFERENCE TO RELATED APPLICATION

This application claims the benefit of U.S. Provisional Application No. 60/208,505, filed Jun. 2, 2000, and of U.S. Provisional Application No. 60/264,024, filed Jan. 26, 2001, whose disclosures are hereby incorporated by reference in their entireties into the present disclosure.

BACKGROUND OF THE INVENTION

1. Field of the Invention

The present invention relates to recordable optical media, such as discs and cards, of the WORM (write once, read many) type with fluorescent data reading, and in particular to the use of such media in a high-capacity 3D optical memory.

2. Description of the Prior Art

The memory volume and signal-to-noise ratio of current optical media are insufficient for new-generation computers and videosystems. Therefore, intensive development of materials for improved optical storage systems is in progress, with the goals of enabling a higher recording density, high signal-to-noise ratio, high resolution and low cost.

Recently, significant attention has been drawn to optical media of the WORM type in which information can be written in a form allowing its retrieval immediately following the recording. The capability of real-time recording is essential for using optical recording in various devices, in particular and primarily for computer systems. The optical recording principle could enable not just unitary copies of data carriers but replication of data in relatively small volumes which today is increasingly in demand.

The underlying principle for all optical recordable materials of practical interest is the photothermal recording. Data are recorded on such materials by scanning the recording layer by a focused laser beam. The energy of the laser beam is absorbed by the layer's active medium and turns to thermal energy causing its physical and chemical changes that can be optically recorded while reading. Among diverse types of photothermal recording on WORM-type optical materials, ablative recording has been chosen for predominant practical application. The characteristic feature of ablative recording is that at melting, evaporation or chemical transformation of the active layer there occur geometric changes of the layer which can be optically registered owing to the change in the reflection factor of the active medium.

Among the materials for ablative recording, considerable attention is drawn to optical WORM discs using as a recordable medium thin (10 to 100 nm) layers of organic dyes of both binder-free and dye-in-polymer types. The layers of organic dyes possess a number of significant advantages as compared to, for instance, metal and semi-metal layers used in WORM discs with ablative recording. The advantages are as follows:

Dyes can have a more selective absorption at the recording laser wavelength.
Dye layers possess a higher stability at higher humidity.
Dye layers are more sensitive to laser radiation due to their low thermal conductivity, thermal capacity and low melting or decomposition point. In this connection, they ensure a higher writing density.
Dye-layers-based materials enable a higher signal-to-noise ratio, as the amorphous layers' own noise is negligible.
Dye layers are made by a simple and cheap spin-coating procedure rather than by vacuum deposition technique applied in manufacturing WORM discs with metal or semi-metal layers.

The capacity of currently manufactured WORM discs based on organic dyes is as high as 4.7 Gigabytes. Such capacity is attained at the expense of higher writing density of the DVD format as compared to the CD. The capacity can be further made twice as high through using two layers. Yet, a further increase in the number of active layers in a WORM disc with ablative recording and reading by changes in the reflection factor leads to a dramatic deterioration of data reproduction due to diffraction of the recording and reading laser beams in ablation-caused irregularities resulting in failure to enlarge the disc capacity. The promising way to increase the capacity of the optical memory carrier is to obtain a multilayer disc with fluorescent reading.

A WORM disc with fluorescent reading has been proposed. The principle of this technique is in that following the process of writing, the information recording centers do not fluoresce, while the background does. At reading by an appropriate laser beam, fluorescent light is excited and recorded by a detector.

The optical recording disc is arranged in such a way that in it, the active layer is applied onto a matte surface of the substrate. Hence, no multilayer discs could be created based on the discs because in them the recording and reading laser beams would undergo considerable scattering.

The most frequently proposed materials to obtain active layers in WORM discs are cyanine dyes, phthalocyanines and porphyrins. Many dyes from these classes possess satisfactory fluorescence in polymer matrices when they form actual solutions, i.e. when they are in a polymer in a molecularly dispersed state. In existing WORM discs with ablative recording, dyes are applied onto a replica with a spiral track as binder-free amorphous thin layers in which the dyes used do not fluoresce.

In some cases, to obtain active layers in WORM discs, dyes-in-polymers are used. To achieve the appropriate level of sensitivity of active layers enabling ablative recording, a maximum high concentration of dye in a polymer matrix is provided, for which due to concentration quenching fluorescence is either drastically reduced or absent altogether.

Consequently, known types of materials applied in single-layer WORM discs and techniques of photothermal data recording thereon cannot be used for multilayer optical recording media with fluorescent reading.

SUMMARY OF THE INVENTION

The present invention has been made in view of the above circumstances and has an object to provide a multilayer optical recordable medium with fluorescent reading enabling a high-capacity optical memory, high signal-to-noise ratio and high sensitivity to recording laser radiation, which may be in any of the ultra-violet, visible and near infra-red ranges.

Further, the present invention provides a multilayer optical recordable medium with fluorescent reading ensuring high-speed and high-density photothermal recording.

Further, the present invention provides a multilayer optical recordable medium with fluorescent reading enabling a high storing stability of the material prior to and following the recording and while reading information.

In compliance with the purpose of the present invention, the above-mentioned multilayer optical recordable medium with fluorescent reading represents a disc or a card, in which each active layer is applied onto a transparent film substrate and includes at least two phases, one of which (fluorescing) contains at least one luminophore capable of absorbing reading radiation of the laser and emitting fluorescent light, while the other phase (quenching) contains at least one substance capable of quenching the luminophore's fluorescence (quencher).

Further, in compliance with the present invention, data recording on the optical medium is provided as a result of irreversible incidence of a fluorescent signal occurring at luminophore-quencher interaction under the action of focused laser radiation that causes heating of the medium. In so doing, prior to the recording the active layer fluoresces, while following the recording the fluorescence disappears in those places that have been affected by the laser light. Data writing and reading can be done by laser radiation of both identical wavelength and different ones. In the former case, data are recorded and read by different laser radiation powers.

Furthermore, in compliance with the present invention, the fluorescing and quenching phases represent polymer thermoplastic layers in immediate contact with each other, or the fluorescing or quenching phase represents two polymer thermoplastic semilayers between which there is a quenching or fluorescing phase, respectively, serving as a polymer thermoplastic layer, or the fluorescing phase represents a polymer thermoplastic layer while the quenching phase represents a transparent binder-free quenching layer, or the fluorescing phase represents two polymer thermoplastic semilayers between which there is a quenching phase as a transparent layer of polymer binder-free quencher. There could be a spacing layer between the fluorescing and quenching layers.

Further, in compliance with the present invention, the fluorescing phase represents a polymer thermoplastic layer comprising a fine-grained sorbent with a luminophore absorbed on its surface, or the quenching phase represents a polymer thermoplastic layer containing a fine-grained sorbent with a quencher adsorbed on its surface, or the two-phase system represents a polymer layer of fluorescing phase with distributed dispersion of the fluorescing phase, or the two-phase system represents a polymer thermoplastic layer in which dispersions of the fluorescing and quenching phases are distributed. Dispersions of the fluorescing and quenching phases could represent small particles of a luminophore or a quencher, respectively, or a fine-grained sorbent with a luminophore or a quencher adsorbed on its surface, or finely divided solid solution of a luminophore or a quencher in a polymer binder.

Furthermore, in compliance with the present invention, to ensure requisite sensitivity of the active layer while using a laser with identical wavelength for both reading and writing, a luminophore and/or quencher are used absorbing radiation of the recording laser; in addition, to the fluorescing and/or quenching phase and/or a spacing laser between them is added a non-fluorescing dye capable of absorbing the laser's recording radiation and convert the absorbed light energy to heat (light absorber).

When a light absorber is introduced into the active medium, there can be used a luminophore and/or a quencher incapable of absorbing at the wavelength of the recording laser. In this case, reading and writing are done by lasers of different wavelengths.

The object of the present invention—to provide an optical WORM-type storage enabling considerably better characteritics of optical memory capacity, signal-to-noise ratio and sensitivity to the recording laser radiation as compared to ones for existing optical recording media—is based on two fundamental principles: 3D (multilayer) memory and fluorescent reading. To ensure high writing rate and density as well as high storing stability of the material prior to and following the recording and while reading information, the present invention makes use of the widely applied and well-proved principle of photothermal recording. However, in contrast to existing WORM discs for ablative recording causing burning of holes, generation of bubbles and changes in the surface texture—all of which, as mentioned above, are absolutely unacceptable for a multilayer material due to diffraction of the laser beam—the present invention provides a photothermal recording technique leading to no geometric changes in the active layer. This is achieved thanks to the fact that the active medium consists of two phases, one of which (fluorescing) comprises a luminophore while the other (quenching) contains a fluorescence quencher. Prior to writing, the active layer fluoresces, since the luminophore and the quencher are in different phases, and there is thus no interaction causing fluorescence quenching. During writing, the focused laser beam energy is absorbed by the active medium and converted to thermal energy. As a result of local heating, the quencher diffuses into the fluorescing phase and reacts with the luminophore, which leads to fluorescence quenching. In this way information is recorded without deformation of the active layer. Data reading is done by scanning the layer by a laser beam exciting fluorescence and by detecting differences in the fluorescent signal intensity between the background and writing spots. Data recording and reading can be done by laser radiation of both the same and different wavelengths. In the former case, reading and writing are done by different laser power radiations.

As pointed out above, the important purpose of the present invention is to provide a multilayer optical recordable medium with fluorescent reading that would ensure high sensitivity to the recording laser radiation and hence high-speed recording and higher information density.

It is known that the sensitivity of optical recordable materials based on the principle of photothermal recording is determined by two major factors: the capability of the active medium to absorb laser radiation and the mass of the material being heated. As the optical density of the medium increases and the mass of the medium decreases, the sensitivity of the material increases. To ensure adiabatic conditions of heating, short writing pulses are used, with low-thermal-conductivity materials chosen for the active medium and matrix. In compliance with the present invention, the crucial sensitivity-defining criteria for the recording optical disc is the effectiveness of the process of approaching of the luminophore and the quencher in the heated spot to a maximum distance of 50 Angstroms to enable fluorescence quenching by the Foerster resonance mechanism.

In the original disc, the fluorescing and quenching phases containing a luminophore and a quencher, respectively, should have such structure and composition and be disposed relative to each other in such a way that a requisite sensitivity is ensured at writing, namely: they should have optimal parameters of optical density, mass and thermal conductivity of the heated material and a high efficiency of fluorescence quenching. The conditions are met in the present invention at the expense of a number of factors, the most important ones being the fluorescing and quenching phases are disposed as will be disclosed below;

the luminophore and/or quencher absorb the recording laser radiation and convert the absorbed light energy to heat;

the fluorescing and/or quenching phase(s) contain(s) a light absorber—a non-fluorescing dye capable of absorbing the laser recording radiation and converting the absorbed light energy to heat;

the quencher absorbs light in the spectral region of the luminophore fluorescence;

the applied polymer media possess requisite thermoplastic characteristics enabling high-speed convergence of the luminophore and quencher in the heated spot; the polymer media are doped with plasticizers to ensure a higher speed of luminophore-quencher convergence in the heated spot.

BRIEF DESCRIPTION OF THE DRAWINGS

Preferred embodiments of the present invention will be set forth in detail with reference to the drawings, in which.

DESCRIPTION OF THE PREFERRED EMBODIMENTS

Various preferred embodiments of the present invention will now be set forth in detail with reference to the drawings.

Figure 1:
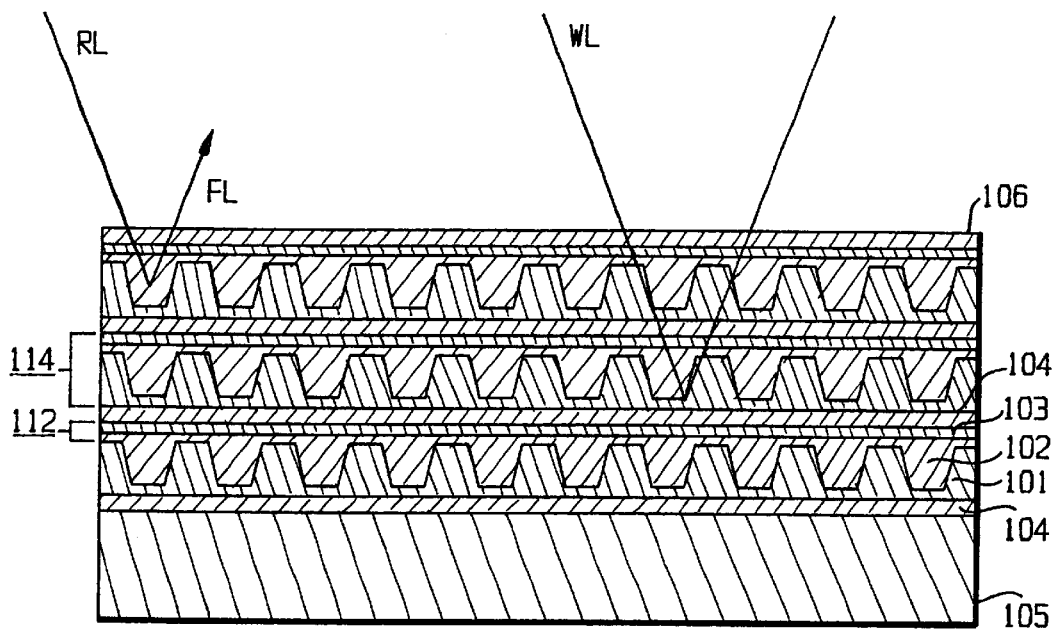
FIG. 1 is a schematic cross-sectional view of the multi-layer recording optical disc with fluorescent reading in compliance with the present invention.
Figure 1A:
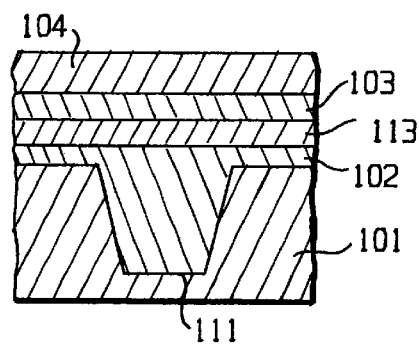
FIG. 1A is a schematic cross-sectional view of a variation of the disc of FIG. 1.

FIG. 1 shows a schematic cross-section view of a preferred embodiment of a multilayer recordable optical disc with fluorescent reading. On a substrate 101 representing a transparent film replica as a spiral track 111 with 0.1–1.0 $\mu$m depressions, an active layer 112 is applied comprising a fluorescent phase 102 as a thermoplastic polymer containing a luminophore filling depressions in the spiral track 111, and a quenching phase 103 as a thermoplastic polymer containing a quencher immediately contacting the fluorescent phase 102, or separated from the fluorescent phase 102 by an intermediate thermoplastic layer shown in FIG. 1A as 113. The film replica of the spiral track 111 is fabricated by hot embossing, thermo- or UV-casting/embossing techniques such as those known in the art. The depressions in the spiral track 111 are filled with the fluorescent phase 102 from a solution by spin coating, roller coating or dip coating techniques, or a solvent-free fluorescent phase is pressed in the depressions of the spiral track 11 while heating above the glass transition temperature of the thermoplastic polymer. The quenching phase is applied onto the fluorescing phase by pouring from the solution or gluing while heating under pressure in a similar way as indicated earlier. The above-mentioned structure in the aggregate forms a single-layer recordable disc 114.

To obtain a multilayer disc 100 designated for a 3D optical memory with fluorescent reading that comprises 2 to 20 one-layer discs 114, single-layer discs 114 are glued to each other using an adhesive layer 104 in such a way that the active layers 112 would alternate with non-active spacing layers 20–130 $\mu$m thick formed on the substrate 101. The multilayer system is glued to a rigid disc 105, which is 0.6–1.2 mm thick. On top of the multilayer system, a protective layer 106 is applied. Such a disk is highly transparent for the wavelengths typical of the recording and reading laser as well as for fluorescence light.

Information is written to the multilayer disc 100 in the following manner. Writing light WL of the appropriate wavelength is focused on a point P to which information is to be written. Because of the focusing, the light WL heats the point P to such a temperature that the fluorescent phase 102 and the quenching phase 103 can intermingle, thus quenching the fluorescence of the fluorescent phase 102. Because the light WL is not sufficiently focused at locations other than the point P to heat those points sufficiently for writing, those other locations are not written to. By refocusing the light WL in three dimensions and thus moving the point P, the entire multilayer disc 100 can be written to.

The multilayer disc 100 can be read in any manner in which other fluorescent multilayer discs are read. For example, reading light RL of the correct wavelength to cause the fluorescing phase to fluoresce can be made incident on all or a portion of the medium. At locations where the fluorescence has not been quenched, fluorescent light FL is emitted. The light FL can be detected to reproduce the information.

The writing light WL and the reading light RL can be of different wavelengths, or they can be of the same wavelength and different intensities. The reading light RL and the fluorescing light FL can be of different wavelengths. Thus, backscattered portions of the reading light RL can be distinguished from the fluorescent light FL or can be filtered out, and the fluorescent light FL does not excite fluorescence elsewhere.

Figure 2:
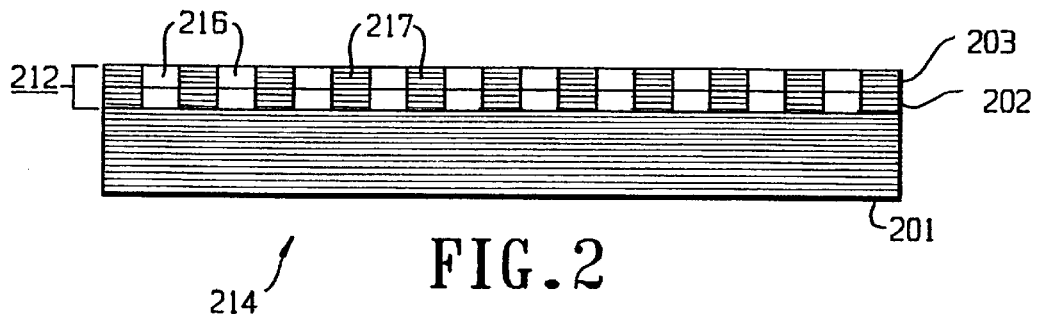
FIGS. 2, 3, 3A, and 4–7 illustrate a schematic cross-sectional view of different embodiments of single-layer recording media in compliance with the present invention.

FIG. 2 illustrates a schematic cross-section view of the single-layer recordable medium 214 differing from the single-layer recording medium 114 in FIG. 1 in that the substrate 201 is not a replica but a smooth film on which the active layer 212 is optically formatted as a spiral track 211. The fluorescent phase 202 and the quenching phase 203 are deposited in any suitable manner to form the active layer 212. The formatting is carried out by means of exposing the active layer 212 by UV light via a photomask. In so doing, exposed sections 216 on which dyes become bleached form a tracking zone while non-exposed areas 217 form a data recording zone.

Figure 3:
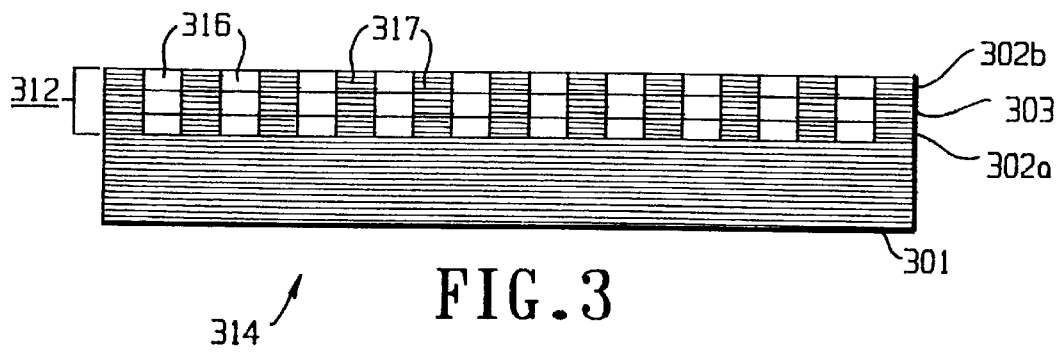

FIG. 3 shows a schematic cross-section of a one-layer recordable medium 314differing from the single-layer recordable medium 214 in FIG. 2 by that the fluorescing medium represents two polymer thermoplastic semilayers 302a and 302b, between which there is a quenching phase as a polymer thermoplastic layer 303. Those three layers form an active layer 312 on the substrate 301. As described above, bleaching is carried out to form exposed sections 316 and non-exposed areas 317.

Figure 3A:
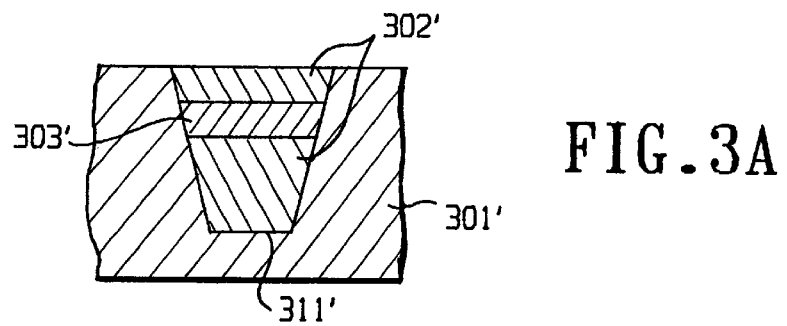

In this embodiment of the recordable medium, the formatting could be also realized through using the substrate as a replica with a spiral track. As shown in FIG. 3A, a substrate 301' has a spiral track 311' containing a quenching phase 303' sandwiched between two fluorescent phases 302'.

Figure 4:
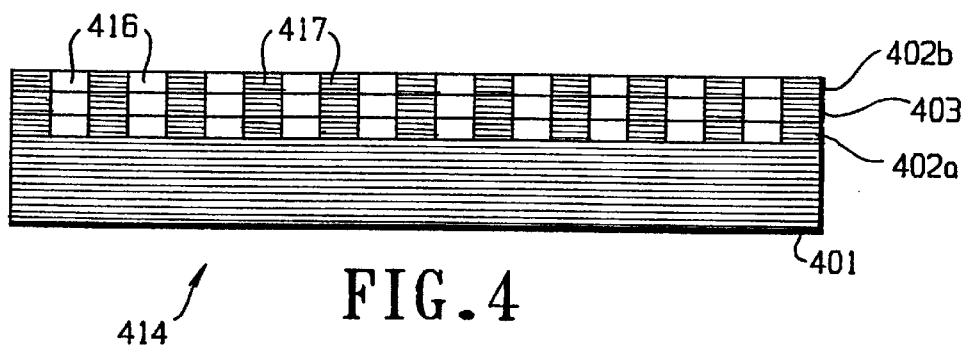

The single-layer recordable medium 412 in FIG. 4 is different from the previous one in that that the quenching phase represents two polymer thermoplastic semilayers 403a and 403b, between which there is a fluorescing phase as a polymer thermoplastic layer 402, all on a smooth substrate 401. The bleached and non-bleached areas 416 and 417 can be formed as described above. Alternatively, an embodiment like that of FIG. 3A, except with the fluorescing phase between two quenching phases, could be realized.

In the recordable media illustrated in FIGS. 1, 1A, 2, 3, 3A, and 4, further enhancement of the sensitivity and optical contrast can also be attained through using the following variants of structure and composition of the active layer:
the quenching phase represents a transparent layer of a polymer-binder-free quencher;
the fluorescing phase represents a thermoplastic polymer layer containing a finely-grained sorbent with a luminophore adsorbed on its surface;
the quenching phase is a polymer thermoplastic layer containing a finely-grained sorbent with a quencher adsorbed on its surface.

Figure 5:
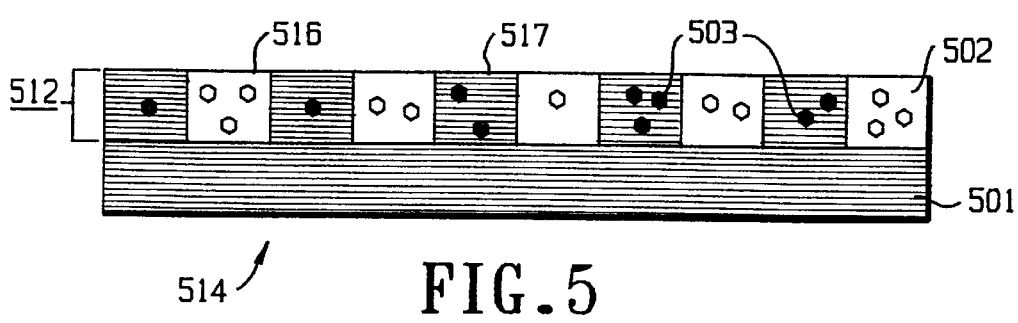

FIG. 5 is a schematic cross-sectional view of a single-layer recordable medium 514 differing from those described above in that the two-phase system (active layer 512) represents a polymer layer of the fluorescing phase 502, in which a dispersion of the quenching phase 503 is distributed. A smooth substrate 501 with bleached and non-bleached areas 516 and 517 can be used, or an embodiment like that of FIG. 3A can be realized.

Figure 6:
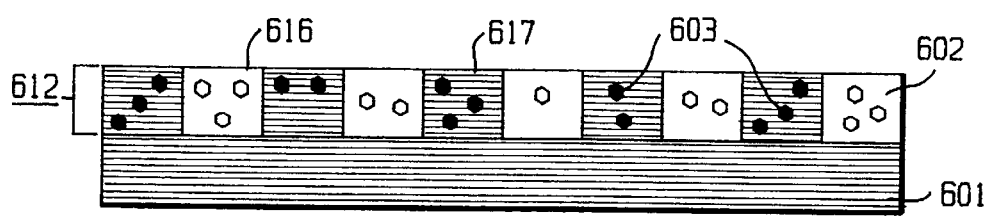

The single-layer recordable medium 614 in FIG. 6 differs from the preceding ones in that the two-phase system (active layer 612) represents a polymer layer of the quenching phase 603, in which a dispersion of the fluorescing phase 602 is distributed. A smooth substrate 601 with bleached and non-bleached areas 616 and 617 can be used, or an embodiment like that of FIG. 3A can be realized.

Figure 7:
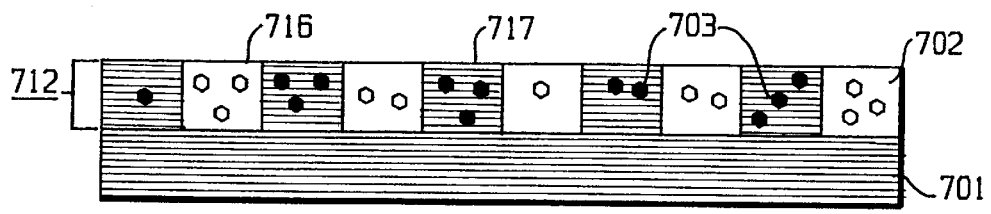

FIG. 7 schematically presents a cross-sectional view of a single-layer recordable medium 714 distinguished by the fact that the two-phase system (active layer 712) represents a polymer thermoplastic layer 708, in which dispersions of the fluorescing phase 702 and the quenching phase 703 are distributed. A smooth substrate 701 with bleached and non-bleached areas 716 and 717 can be used, or an embodiment like that of FIG. 3A can be realized.

Figure 8A:
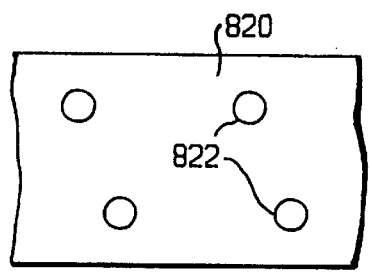
FIGS. 8A–8C illustrate different ways in which the flourescing and quenching layers can be dispersed.
Figure 8B:
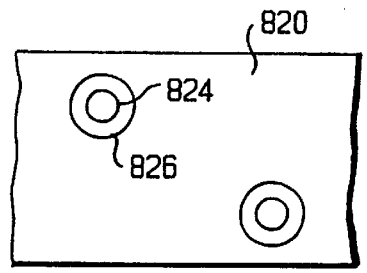
Figure 8C:
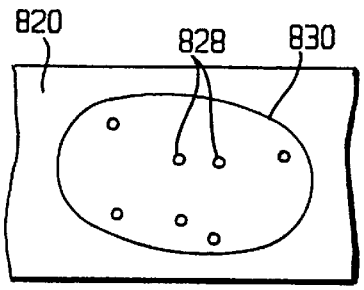

In the recordable media schematically illustrated in FIGS. 5–7, dispersions of fluorescing and/or quenching phases could represent any of the following possibilities shown in FIGS. 8A–8C:
fine particles 822 of a hard luminophore and/or quencher in a matrix 820;
highly dispersed sorbent 824 with a luminophore or and/or quencher 826 adsorbed on its surface, also in a matrix 820; or
finely divided solid solution of a luminophore and/or quencher 828 in a polymer binder 830.

A further purpose of the present invention is providing a multilayer optical recordable medium with fluorescent reading that ensures a high signal-to-noise ratio (optical contrast) of the recording enabling an error-free reproduction of recorded information.

This objective can be gained through using luminophores and media for the fluorescent phase such that they would ensure a high level of the fluorescent signal while reading, and quenchers enabling an efficient transfer of excited luminophore's electron energy. The luminophores used should have a high fluorescence quantum yield and a high Stokes shift. A higher level of the fluorescent signal can also be achieved by addition in the fluorescing phase of two luminophores, with the absorption spectral range of one of them overlapping with the fluorescence spectral range of the other one. The quencher should ensure the requisite level of reduction of the fluorescent signal while writing at its concentration in the active layer one or two orders of magnitude lower than that of the luminophore.

Furthermore, the important purpose of the present invention is to provide a multilayer optical recordable medium with fluorescent reading ensuring requisite material retention characteristics prior and following data recording and in the process of reading.

This object can be gained owing to the following specific features of the material:
the utilized luminophores, quenchers, light absorbers, polymer binders, high-dispersion sorbents, film substrates, adhesives, etc. should possess a requisite and sufficient thermal and photochemical stability and do not make a mutually negative effect on the keeping quality;
data can be recorded and read by lasers of different radiation wavelengths thus enabling a better keeping quality of the active layer at multiple reading. In so doing, the luminophore does not absorb light at the wavelength of the recording laser emitting in a shorter-wave spectral band as compared to the laser used for reading;
data can be written and read by different wavelength lasers; in this case, the quencher does not absorb light at recording and/or reading laser radiation wavelengths;
data can be written and read by different wavelength lasers; in this case, the light absorber does not absorb light at the reading laser radiation wavelength.

In the present invention, luminophores are selected from compounds related to polycyclic condensed aromatic hydrocarbons and derivatives thereof, hydrocarbons containing arylethylene and arylacetylene moieties and derivatives thereof, as well as coumarin, xanthene, acridine, oxazine, azine, perylene, terylene, violanthrone, cyanine, phthalocyanine, indigoid, thioindigoid, complex metal dyes and porphyrins.

Quenchers are selected from compounds that decrease the intensity of fluorescence of the above-mentioned dyes including ones based on aromatic hydrocarbons and their derivatives, phthalocyanine, naphthalocyanine, complex metal, radical, coumarin, xanthene, quinone, azo, polymethyne, acridine, quinoneimide, azine, diphenylmethane, indigoid, thioindigoid, triphenylmethane and related dyes.

Substrates are selected from polycarbonate, polycycloolefin, polymethylacrylate, polymethylmetacrylate and polystyrene films, as well as the films covered by such polymers as polymethylacrylate, polyvinyl chloride, chlorinated polyvinyl chloride, acrylate and epoxy photo-polymerized plastics, etc.

Polymers for fluorescing and quenching phases are chosen from resins including acrylic and vinyl polymers, alkyd, coumarone-indene, epoxy and phenolic resins, fluoropolymers, aminoplasts, polyacetals, polyacrylics, polyalkylenes, polyalkenylenes, polyalkynylenes, polyamic acids, polyamides, polyanhydrides, polyarylenealkenylenes, polyarylenealkylenes, polyarylenes, polyazomethynes, polybenzimidazoles, polybenzothiazoles, polybenzoxazinones, polybenzoxazoles, polybenzyls, polycarbodiimides, polycarbonates, polycarboranes, polycarbosilanes, polycyaurates, polydienes, polyester-polyuretanes, polyesters, polyetheretherketones, polyether-polyuretanes, polyethers, polyhydrazides, polyimidazoles, polyimides, polyimines, polyisocyanurates, polyketones, polyolefins, polyoxadiazoles, polyoxides, polyoxyalkylenes, polyoxyarylenes, polyoxymethylenes, polyoxyphenylenes, polyoxyphenyls, polyphosphazenes, polyquinolines, polyquinoxalines, polysilanes, polysilazanes, polysiloxazanes, polysilsesquioxanes, polysulfonamides, polysulfones, polythiazoles, polythioalkylenes, polythioarylenes, polythioethers, polythiomethylenes, polyureas, polyurethanes, polyvinyl acetals, polyvinyl butyrals and polyvinyl formals.

Aerosil, titanium dioxide, aluminosilicates, titanosilicates, etc. are selected as highly dispersed sorbents for luminophore and quencher adsorption.

Light absorbers are chosen from compounds absorbing radiation of the recording laser and effectively converting light energy to thermal one, among the compounds there are phthalocyanine, naphthalocyanine, complex metal, radical, coumarin, xanthene, quinone, azo, polymethyne, acrydine, quinoneimide, azine, diphenylmethane, indigoid, thioindigoid, triphenylmethane and related dyes.

Plasticizers are selected from alkyl phthalates, phosphates, adipates and sebacates, polyethers, epoxides, etc.

UV-solidified lens cement or thermoplastic materials gluing when heated under pressure are used as an adhesive for a multilayer system.

The examples given below illustrate the essence of the preferred embodiments but are not confined by them.

EXAMPLE 1

From a Bayer 125-$\mu$m Macrofol PC-film, a substrate was made using the hot embossing technique; the substrate represented a disc with external diameter 120 mm and internal diameter 15 mm, with a replica as a spiral track corresponding to the CD-R format (Orange Book, part II), but 0.1 $\mu$m, rather than 0.5 $\mu$m, deep. Depressions in the spiral track were filled with a fluorescing phase by spin coating of the disc with a solution of 5% polyvinyl butyral (PVB) and 0.01% Oxazine 725 (Exciton, Inc.) in diacetone alcohol followed by drying. On the backside of the resulting disc, an adhesive layer of 5%-solution of styrene-methacrylate copolymer was applied; then, following by drying a layer of quenching phase was applied from a solution of 3% chlorinated polyvinyl chloride (CPVC) and 0.001% phthalocyanine Irgaphor Super Green OS (Ciba) in a 1:1 mixture of methylethylketone and toluene.

The five above-mentioned discs were put one above another in a metal block with a 15-mm central core and were subjected to heating at 80° C. under 5-ton pressure. In doing so, the film discs were cemented forming a multilayer system, in which the fluorescing and quenching phases were in an immediate contact. The multilayered sandwich was glued to a hard PC disc 1.2-mm thick.

On the resulting disc, information was written using consecutive scanning of each active layer by focused laser beam. Data retrieval was done similarly.

EXAMPLE 2

The film substrate was obtained similarly to Example 1. On the backside of the replica a layer of quenching phase was applied from a solution of 3% CPVC and 0.001% phthalocyanine Irgaphor Super Green OS (Ciba) in a 1:1 mixture of methylethylketone and toluene. After the drying, a layer of fluorescing phase was applied onto the quenching phase from a solution of 5% PVB and 0.01% Oxazine 725 (Exciton, Inc.) in diacetone alcohol.

The five above-mentioned discs were put one above another in a metal block with a 15-mm central core and were subjected to heating at 80° C. under 5-ton pressure. In doing so, the fluorescing phase was pressed in depressions of the spiral track and the film discs were cemented forming a multilayer system, in which the fluorescing and quenching phases were in an immediate contact. The multilayered sandwich was glued to a hard PC disc 1.2-mm thick.

EXAMPLE 3

Depressions in the spiral track of the replica made similarly to Example 1, a quenching phase was filled by spin coating of the disc with a solution of 3% copolymer (vinylchloride, vinylacetate and hydroxypropylacrylate) and 0.0005% phthalocyanine Irgaphor Super Green OS (Ciba) in diacetone alcohol. On the backside of the resulting disc, a layer of quenching phase was applied from a solution of 3% CPVC and 0.0005% phthalocyanine Irgaphor Super Green OS (Ciba) in a mixture of methylethylketone and toluene; following the drying, a layer of fluorescing phase was applied from a solution of 5% PVB and 0.01% Oxazine 725 (Exciton, Inc.) in diacetone alcohol.

The multilayer disc was generated similarly to Example 1.

EXAMPLE 4

On a replica obtained similarly to Example 1, a layer of quenching phase was applied from a solution of 0.003% phthalocyanine Irgaphor Super Green OS (Ciba) in diacetone alcohol without a polymer binder. On the backside of the resulting disc, a layer of quenching phase was applied from a solution of 3% CPVC and 0.0005% phthalocyanine Irgaphor Super Green OS (Ciba) in a mixture of methylethylketone and toluene; then, following the drying, a layer of fluorescing phase was applied from a solution of 3% copolymer (vinylchloride, vinylacetate and hydroxypropylacrylate) and 0.01% Rhodamine dye LD 700 (Exciton, Inc.) in diacetone alcohol.

The multilayer disc was generated similarly to Example 1.

EXAMPLE 5

On a replica obtained similarly to Example 1, a layer of quenching phase was applied from a solution of 0.001% phthalocyanine Irgaphor Super Green OS (Ciba) and 0.003% of cyanine dye Ec 2169 (Organica, Feinchemie GmbH, Wolfen) in diacetone alcohol without a polymer binder. On the backside of the resulting disc, a layer of quenching phase was applied from a solution of 3% CPVC and 0.0005% phthalocyanine Irgaphor Super Green OS (Ciba) in a mixture of methylethylketone and toluene; then, following the drying, a layer of fluorescing phase was applied from a solution of 3% copolymer (vinylchloride and vinylacetate) and 0.01% Rhodamine dye LD 700 (Exciton, Inc.) in diacetone alcohol.

The multilayer disc was generated similarly to Example 1.

EXAMPLE 6

On a replica obtained similarly to Example 1, a layer of quenching phase was applied from a solution of 0.001% phthalocyanine Irgaphor Super Green OS (Ciba) in diacetone alcohol without a polymer binder. On the backside of the resulting disc, a layer of quenching phase was applied from a solution of 3% CPVC and 0.0005% phthalocyanine Irgaphor Super Green OS (Ciba) in a mixture of methylethylketone and toluene; then, following the drying, a layer of fluorescing phase was applied from a solution of 3% copolymer (vinylchloride and vinylacetate) and 0.01% lumogen ROT 300 (BASF) in diacetone alcohol.

The multilayer disc was generated similarly to Example 1.

EXAMPLE 7

From a 50-$\mu$m Zeonor 1420R (Nippon Zeon Co., Ltd.) polycycloolefin (PCO) film, a substrate was made using the hot embossing technique; the substrate represented a disc with external diameter 120 mm and internal diameter 15 mm, with a replica as a spiral track corresponding to the DVD-R format, but 0.1 $\mu$m, rather than 0.5 $\mu$m, deep.

The single-layer disc was formed similarly to Example 4. Thereafter a 12-layer disc was made, for which purpose single-layer film discs were cemented and glued to a hard disc 0.6 mm thick similarly to Example 1.

EXAMPLE 8

On a replica obtained similarly to Example 6, a layer of quenching phase was applied from a solution of 0.001% phthalocyanine Irgaphor Super Green OS (Ciba) and 0.003% of cyanine dye 683 (Organica, Feinchemie GmbH, Wolfen) in diacetone alcohol without a polymer binder. On the backside of the resulting disc, a layer of quenching phase was applied from a solution of 3% CPVC and 0.0005% phthalocyanine Irgaphor Super Green OS (Ciba) in a mixture of methylethylketone and toluene; then, following the drying, a layer of fluorescing phase was applied from a solution of 3% copolymer (vinylchloride, vinylacetate and hydroxypropylacrylate)) and 0.01% Rhodamine dye LD 700 (Exciton, Inc.) in diacetone alcohol.

The multilayer disc was generated similarly to Example 6.

The optical discs fabricated in accordance to examples 1–8 were installed on a drive and recorded at 1.2 m/s by means of focused 300-ns pulses generated by a semiconductor laser radiating at 650 nm with a laser beam half-width diameter of 0.6 µm and replica output of 2 mW. For comparison, a CD-R (TDK) was used on which ablative writing and reading was performed by changes in the reflection index.

On the tested specimens, a fluorescence signal drop was observed in spots subjected to the action of writing laser radiation. In this case, no deformation of the active layer was noted. In the case of CD-R under above-mentioned conditions, there occurred ablative recording as thermal punching. Testing of disc specimens prior to and following the writing while keeping them in thermostats at 70° C. and relative humidity 85% during one month showed that their operation characteristics remained unchanged.

Figure 9A:
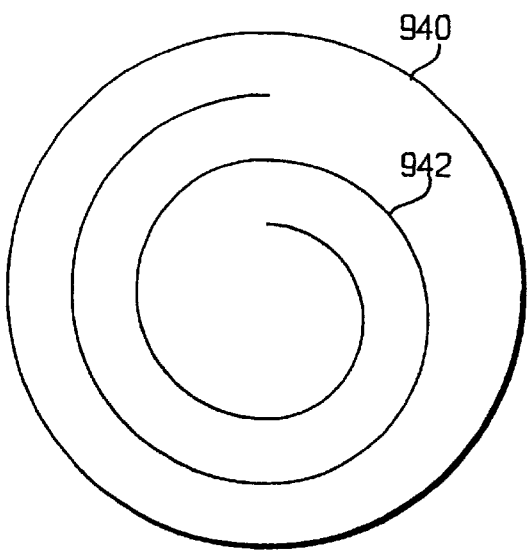
FIGS. 9A–9C illustrate different medium formats in which the present invnetion can be implemented.
Figure 9B:
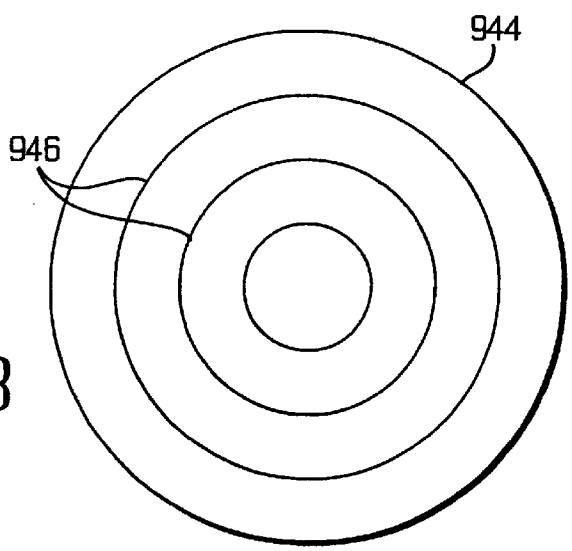
Figure 9C:
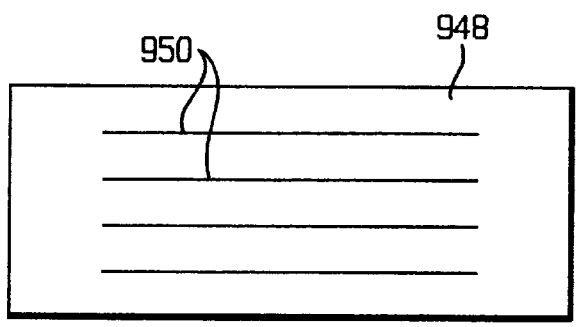

Table 1 summarizes disc specimen parameters prior and following data writing.

embodiments can be realized within the scope of the invention. For example, recitations of specific numerical values ranges are illustrative rather than limiting. The same is true of recitations of specific recording formats such as the CD-ROM format, since the present invention could be used for any suitable disc, card, or other format. For example, as shown in FIGS. 9A–9C, the medium could be a disc 940 with a spiral track 942, a disc 944 with multiple concentric tracks 946, a card 948 with multiple straight tracks 950, or any other suitable configuration. Also, the multilayer disc can be formed from any single-layer media disclosed in the application, with reading and writing performed as described above. Therefore, the present invention should be construed as limited only by the appended claims.

What is claimed is:

1. A multilayer recordable optical medium for writing by writing light and fluorescent reading by reading light, the reading light causing a generation of fluorescent light, the medium comprising a plurality of recordable medium layers layers, each recordable medium layer comprising:
   a substrate that is transparent to the writing light, the reading light, and the fluorescent light; and
   an active layer applied onto the substrate;
   wherein the active layer comprises:
      a fluorescing phase comprising at least one luminophore capable of absorbing the reading light and emitting the fluorescent light; and
      a quenching phase comprising at least one substance capable of quenching a fluorescence of the at least one luminophore.

2. The medium of claim 1, wherein the reading light and the writing light have a common wavelength.

3. The medium of claim 1, wherein the reading light and the writing light have different wavelengths.

4. The medium of claim 1, wherein the fluorescing and quenching phases constitute polymer thermoplastic layers in immediate contact with each other.

5. The medium of claim 1, wherein fluorescing phase comprises two polymer thermoplastic semilayers, between

|  | Original disc parameters prior to data recording | | | Disc parameters after optical recording | |
| --- | --- | --- | --- | --- | --- |
| Examples | Fluorescent signal from tracking zone, nW | Fluorescent signal from writing zone, nW | Optical contrast between tracking and writing zones | Optical contrast characterizing data writing | Number of readout cycles, $\times 10^5$ |
| 1 | 50 | 120 | 2.4 | 3 | 2 |
| 2 | 40 | 100 | 2.5 | 4 | 1.7 |
| 3 | 50 | 100 | 2.0 | 3 | 1.2 |
| 4 | 55 | 200 | 3 | 6 | 0.9 |
| 5 | 60 | 200 | 3.3 | 5 | 1.1 |
| 6 | 50 | 150 | 3.0 | 4 | 10 |
| 7 | 50 | 90 | 1.5 | 5.5 | 3 |
| 8 | 50 | 100 | 2.0 | 3 | 2.5 |

The above tests have shown that the resulting disc specimens possess a high-capacity optical memory (56.4 gigabyte for a 12-layer specimen) and sufficient sensitivity to the recording laser radiation, they ensure a high speed and high density of photothermal recording and are suitable for writing and reproduction of information with fluorescent reading on existing drives upon making insignificant changes in their design.

While various preferred embodiments have been set forth above in detail, those skilled in the art who have reviewed the present disclosure will readily appreciate that other which the quenching phase is provided as a polymer thermoplastic layer.

6. The medium of claim 1, wherein the quenching phase comprises two polymer thermoplastic semilayers, between which fluorescing phase is provided as a polymer thermoplastic layer.

7. The medium of claim 1, wherein the fluorescing phase comprises a polymer thermoplastic layer, and the quenching phase comprises a binder-free quenching transparent layer.

8. The medium of claim 1, wherein the fluorescing phase comprises two polymer thermoplastic semilayers, between which the quenching phase is provided as a binder-free quenching transparent layer.

9. The medium of claim 1, wherein the active layer further comprises a spacing layer between the fluorescing and quenching phases.

10. The medium of claim 1, wherein the fluorescing phase comprises a polymer thermoplastic layer and a grained sorbent dispersed in the polymer thermoplastic layer with the at least one luminophore adsorbed on a surface of the sorbent.

11. The medium of claim 10, wherein the sorbent is selected from the group consisting of Areosil, titanium dioxide, aluminosilicates, and titanosilicates.

12. The medium of claim 1, wherein the quenching phase comprises a polymer thermoplastic layer and a grained sorbent dispersed in the polymer thermoplastic layer with the at least one quencher adsorbed on a surface of the sorbent.

13. The medium of claim 12, wherein the sorbent is selected from the group consisting of Areosil, titanium dioxide, aluminosilicates, and titanosilicates.

14. The medium of claim 1, wherein the active layer comprises a polymer layer of the fluorescing phase in which the quenching phase is dispersed.

15. The medium of claim 14, wherein the quenching phase comprises particles of a solid quencher.

16. The medium of claim 15, wherein the particles of the solid quencher are enclosed in a polymer binder.

17. The medium of claim 14, wherein the quenching phase comprises a dispersed sorbent with the at least one quencher adsorbed on a surface of the sorbent.

18. The medium of claim 17, wherein the sorbent is selected from the group consisting of Areosil, titanium dioxide, aluminosilicates, and titanosilicates.

19. The medium of claim 1, wherein the active layer comprises a polymer layer of the quencher in which the fluorescing phase is dispersed.

20. The medium of claim 19, wherein the fluorescing phase dispersion comprises particles of a solid luminophore.

21. The medium of claim 20, wherein the particles of the solid luminophore are enclosed in a polymer binder.

22. The medium of claim 19, wherein the fluorescing phase comprises a dispersed sorbent with the at least one luminophore adsorbed on a surface of the sorbent.

23. The medium of claim 22, wherein the sorbent is selected from the group consisting of Areosil, titanium dioxide, aluminosilicates, and titanosilicates.

24. The medium of claim 1, wherein the active layer comprises a polymer thermoplastic layer in which dispersions of the fluorescing and quenching phases are distributed.

25. The medium of claim 1, wherein the at least one luminophore does not absorb the writing light.

26. The medium of claim 1, wherein the at least one luminophore absorbs the writing light.

27. The medium of claim 1, wherein the at least one quencher absorbs the writing light.

28. The medium of claim 1, wherein the at least one quencher absorbs the fluorescent light.

29. The medium of claim 1, wherein the at least one quencher does not absorb the fluorescent light.

30. The medium of claim 1, wherein the fluorescing phase comprises a non-fluorescing dye capable of absorbing the writing light and converting the absorbed writing light to heat.

31. The medium of claim 30, wherein the non-fluorescing dye does not absorb the reading light or the fluorescing light.

32. The medium of claim 31, wherein the non-fluorescing dye is selected from the group consisting of phthalocyanine, naphthalocyanine, complex metal, radical, coumarin, xanthene, quinone, azo, polymethyne, acrydine, quinoneimide, azine, diphenylmethane, indigoid, thioindigoid, and triphenylmethane.

33. The medium of claim 30, wherein the non-fluorescing dye is selected from the group consisting of phthalocyanine, naphthalocyanine, complex metal, radical, coumarin, xanthene, quinone, azo, polymethyne, acrydine, quinoneimide, azine, diphenylmethane, indigoid, thioindigoid, and triphenylmethane.

34. The medium of claim 1, wherein the quenching phase comprises a non-fluorescing dye capable of absorbing the writing light and converting the absorbed writing light to heat.

35. The medium of claim 34, wherein the non-fluorescing dye does not absorb the reading light or the fluorescing light.

36. The medium of claim 35, wherein the spacing layers comprise a material selected from the group consisting of UV-solidified lens cements and thermoplastic materials gluing when heated under pressure.

37. The medium of claim 35, wherein the non-fluorescing dye is selected from the group consisting of phthalocyanine, naphthalocyanine, complex metal, radical, coumarin, xanthene, quinone, azo, polymethyne, acrydine, quinoneimide, azine, diphenylmethane, indigoid, thioindigoid, and triphenylmethane.

38. The medium of claim 35, wherein the non-fluorescing dye is selected from the group consisting of phthalocyanine, naphthalocyanine, complex metal, radical, coumarin, xanthene, quinone, azo, polymethyne, acrydine, quinoneimide, azine, diphenylmethane, indigoid, thioindigoid, and triphenylmethane.

39. The medium of claim 1, wherein the fluorescing phase comprises two luminophores with an absorption spectral range of one of the two luminophores overlapping with a fluorescence spectral range of the other of the two luminophores.

40. The medium of claim 1, wherein the at least one luminophore is selected from the group consisting of compounds related to polycyclic condensed aromatic hydrocarbons and derivatives thereof, hydrocarbons containing arylethylene and arylacetylene moieties and derivatives thereof, coumarin, xanthene, acridine, oxazine, azine, perylene, terylene, violanthrone, cyanine, phthalocyanine, indigoid, thioindigoid, complex metal dyes and porphyrins.

41. The medium of claim 40, wherein the quencher is selected from thr group consisting of compounds based on aromatic hydrocarbons and their derivatives, phthalocyanine, naphthalocyanine, complex metal, radical, coumarin, xanthene, quinone, azo, polymethyne, acridine, quinoneimide, azine, diphenylmethane, indigoid, thioindigoid, and triphenylmethane.

42. The medium of claim 1, wherein the substrate is formed from a material selected from the group consisting of polycarbonate, polycycloolefin, polymethylacrylate, polymethylmetacrylate and polystyrene films.

43. The medium of claim 1, wherein the substrate comprises a polymer selected from the group consisting of polymethylacrylate, polyvinyl chloride, chlorinated polyvinyl chloride, acrylate and epoxy photopolymerized plastics.

44. The medium of claim 1, wherein each of the fluorescing and quenching phases comprises a resin selected from the group consisting of acrylic and vinyl polymers, alkyd, coumarone-indene, epoxy and phenolic resins, fluoropolymers, aminoplasts, polyacetals, polyacrylics, polyalkylenes, polyalkenylenes, polyalkynylenes, polyamic acids, polyamides, polyanhydrides, polyarylenealkenylenes, polyarylenealkylenes, polyarylenes, polyazomethynes, polybenzimidazoles, polybenzothiazoles, polybenzoxazinones, polybenzoxazoles, polybenzyls, polycarbodiimides, polycarbonates, polycarboranes, polycarbosilanes, polycyaurates, polydienes, polyesterpolyuretanes, polyesters, polyetheretherketones, polyetherpolyuretanes, polyethers, polyhydrazides, polyimidazoles, polyimides, polyimines, polyisocyanurates, polyketones, polyolefins, polyoxadiazoles, polyoxides, polyoxyalkylenes, polyoxyarylenes, polyoxymethylenes, polyoxyphenylenes, polyoxyphenyls, polyphosphazenes, polyquinolines, polyquinoxalines, polysilanes, polysilazanes, polysiloxazanes, polysilsesquioxanes, polysulfonamides, polysulfones, polythiazoles, polythioalkylenes, polythioarylenes, polythioethers, polythiomethylenes, polyureas, polyurethanes, polyvinyl acetals, polyvinyl butyrals and polyvinyl formals.

45. The medium of claim 1, wherein each of the fluorescing and quenching phases comprises a plasticizer.

46. The medium of claim 1, wherein, in each of the fluorescing and quenching phases, the plasticizer is selected from the group consisting of alkyl phthalates, phosphates, adipates and sebacates, polyethers, and epoxides.

47. The medium of claim 1, comprising from two to twenty of the recordable medium layers.

48. The medium of claim 47, wherein the recordable medium layers alternate with spacing layers.

49. The medium of claim 1, wherein the medium is formed as a disc.

50. The medium of claim 1, wherein the medium is formed as a card.

51. A method of recording information, the method comprising:
  (a) providing a multilayer recordable optical medium for writing by writing light and fluorescent reading by reading light, the reading light causing a generation of fluorescent light, the medium comprising a plurality of recordable medium layers layers, each recordable medium layer comprising:
    a substrate that is transparent to the writing light, the reading light, and the fluorescent light; and
    an active layer applied onto the substrate;
    wherein the active layer comprises:
      a fluorescing phase comprising at least one luminophore capable of absorbing the reading light and emitting the fluorescent light; and
      a quenching phase comprising at least one substance capable of quenching a fluorescence of the at least one luminophore; and
  (b) focusing the writing light on a point on one of the active layers on which the information is to be written so as to heat the medium at the point to such a temperature that the fluorescing and quenching phases are irreversibly intermixed.

52. The method of claim 51, wherein the writing light is ultraviolet light.

53. The method of claim 51, wherein the writing light is visible light.

54. The method of claim 51, wherein the writing light is near infrared light.

55. A method of recording and reproducing information, the method comprising:
  (a) providing a multilayer recordable optical medium for writing by writing light and fluorescent reading by reading light, the reading light causing a generation of fluorescent light, the medium comprising a plurality of recordable medium layers layers, each recordable medium layer comprising:
    a substrate that is transparent to the writing light, the reading light, and the fluorescent light; and
    an active layer applied onto the substrate;
    wherein the active layer comprises:
      a fluorescing phase comprising at least one luminophore capable of absorbing the reading light and emitting the fluorescent light; and
      a quenching phase comprising at least one substance capable of quenching a fluorescence of the at least one luminophore;
  (b) focusing the writing light on a point on one of the active layers on which the information is to be written so as to heat the medium at the point to such a temperature that the fluorescing and quenching phases are irreversibly intermixed; and
  (c) irradiating the reading light on at least a portion of the medium to cause the fluorescing phase to emit the fluorescent light where the fluoresing phase has not been intermixed with the quenching phase.

56. The method of claim 55, wherein the reading light and the writing light are of different wavelengths.

57. The method of claim 55, wherein the reading light and the writing light are of a same wavelength but different intensities.

* * * * *